United States Patent [19]
Larson

[11] 3,792,274
[45] Feb. 12, 1974

[54] SCINTILLATION CAMERA WITH IMPROVED RESOLUTION

[75] Inventor: Agne Larson, Vastra Frolunda, Sweden

[73] Assignee: Nuclear-Chicago Corporation, Des Plaines, Ill.

[22] Filed: Oct. 19, 1971

[21] Appl. No.: 190,618

[52] U.S. Cl. ............... 250/368, 250/86, 250/105
[51] Int. Cl. ............................................. G01t 1/20
[58] Field of Search ................. 250/71.5 S, 86, 105

[56] References Cited
UNITED STATES PATENTS

| | | |
|---|---|---|
| 3,248,547 | 4/1966 | Van de Geijn...................... 250/86 |
| 3,432,660 | 3/1969 | Anger............................. 250/71.5 S |
| 3,631,244 | 12/1971 | Bergstedt....................... 250/71.5 S |
| 3,631,249 | 12/1971 | Friede et al.......................... 250/86 |
| 3,633,031 | 1/1972 | Pesce et al...................... 250/105 X |

Primary Examiner—Archie R. Borchelt
Attorney, Agent, or Firm—Walter C. Ramm; Peter J. Sgarbossa; Charles H. Thomas, Jr.

[57] ABSTRACT

An Anger-type scintillation camera system fitted with a gamma ray filter between the object under study and the detector and an output signal filter, in mechanical or electrical form, associated with an image recording film. The gamma ray filter and output signal filter scan in synchronism so that the total radioactivity distribution in the object is documented on the film.

10 Claims, 10 Drawing Figures

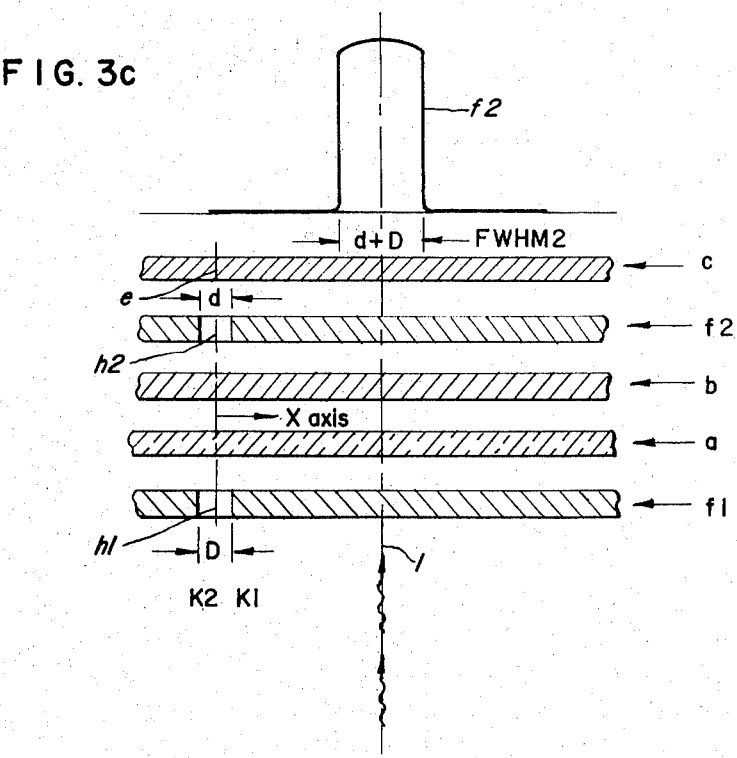

SCINTILLATION CAMERA WITH IMPROVED RESOLUTION

The present invention deals with apparatus for improving the resolution of a camera type device for detecting, registering and documenting ionizing radiation (such as gamma rays and x-rays) which comprises, in one embodiment, an absorption filter for ionizing radiation in combination with, and acting jointly in registering and documenting apparatus with, an optical absorption filter whose outer boundary and character are determined by the geometry of the absorption filter for ionizing radiation and the resolution of the apparatus for the detection of ionizing radiation. In an alternate embodiment an electrical analog of the optical absorption filter is provided in association with the registering and documenting apparatus.

Camera type devices for detecting, registering and documenting ionizing radiation are employed in medicine for determining a radionuclide distribution in a human organ. In this technique, the objective is to scan the radionuclides in the most accurate possible manner within a suitably short examination period. The sharpness of detail in the image of the radionuclide distribution is determined by the resolution of the collimator, through which is transmitted only such ionizing radiation which is incident on a limited portion of the detector within a defined solid angle, and by the resolution of the detector and the recording apparatus.

In present day camera type systems, in the case of detecting ionizing radiation of a given energy, one utilizes the possibility of optimizing the resolution of the collimator in an advantageous fashion in terms of the sensitivity of the detector and the resolution of the detector in an optimum manner with respect to the uniformity in sensitivity over the the detector surface. Optimization of the resolution of camera type systems has apparently reached a limit which is principally determined by resolution of the detectors.

It is the principal object of this invention to provide a radiation camera system having improved resolution by bypassing in an advantageous fashion the intrinsic resolution of the detector employed in the camera system.

In its broadest sense, this invention employs a radiation filter means interposed between an object containing a radioactivity distribution and a radiation sensitive transducer in the detector and a signal filtering means at the output of the detector which operates in conjunction with a documentation medium, such as photographic film. The radiation filter means defines a plurality of mutually spaced passageways to the transducer for radiation quanta emitted from the object and the signal filtering means receives the output from the radiation detector and produces on the documentation medium, in limited areas at positions corresponding to coordinates of intersection of the central axes of the passageways in the radiation filter means with the transducer, a visual documentation of at least a portion of the quanta of radiation interacting with the transducer. A scanning means produces synchronous relative scanning between the object and the radiation filter means and between the documentation medium and the signal filtering means so that all of the object is exposed to the transducer. The size and separation distance of the passageways in the radiation filter means and the size of the limited areas of documentation are preselected in terms of the full width at half maximum resolution value of the detector to produce a desired amount of improvement in resolution of the radiation camera system.

The basic idea of the embodiments of the invention disclosed is that documentation is preformed for a determinable fraction of the detected collimated ionizing radiation (or radiation quanta) which are transmitted through the non-absorbing parts (i.e. the passageways) of the radiation filter. In the embodiment which employs an optical absorption filter as the signal filtering means, the determinable fraction is determined by the geometry of the optical absorption filter. In the embodiment which employs an electrical signal filter as the signal filtering means, the determinable fraction is determined by the settings of the electrical elements. The geometry of the optical absorption filter in one case or the settings of the electrical elements in the other case is essentially determined such that the absorbing parts or the electrical circuitry will prevent the documentation of those detected radiation quanta whose coordinate location in the output signal is such that they would not be signaled at that position if the resolution of the detector were more nearly ideal.

The absorption filter for ionizing radiation, depending on its construction material and the energies of the ionizing radiation to be detected, has a certain extension in the direction of motion of the coolimated radiation toward the detector. In this manner, the radiation filter itself can constitute a system for collimating the ionizing radiation which is to be detected or can represent an integral part in such a system. The radiation filter can also be a part separate from the multichannel collimator which is most frequently used, and can be employed between the collimator and the transducer or between the collimator and the object under study. In the case of measurement with a pinhole collimator, the collimating property of the radiation filter is of subordinate significance with a suitable construction material for the filter.

As pointed out above, the absorption filter for ionizing radiation and the optical absorption filter (or its electrical analog) are designed such that they scan synchronously in such a manner that they act together, so that each part of the detector will be exposed to the ionizing radiation which is to be detected, registered and documented.

The collimated ionizing radiation which reaches the detector carries information concerning the distribution of a radionuclide in a human or animal organ, for example, and a more accurate imaging of the radionuclide distribution can be obtained if detection, registering and documentation take place by means of the apparatus which is characteristic of this invention.

According to the present invention, the problem of the limited resolution of camera type sytems for the detection, registering and documentation of ionizing radiation, which is due to the resolution of the detectors, has been solved.

Literature concerning camera type systems for the detection, registering and documentation of ionizing radiation: Anger, H. O., "Radioisotope Cameras", *Instrumentation in Nuclear Medicine*, Vol. 1, Chapter 19, Academic Press, New York 1967, edited by G. J. Hine.

Other objects, features and advantages of this invention will be apparent from a consideration of the following detailed description in conjunction with the accompanying drawings in which:

FIGS. 3a to 3c are schematic diagrams of a detector, registering system, and documentation system together with one embodiment in accordance with this invention;

Figure 1:
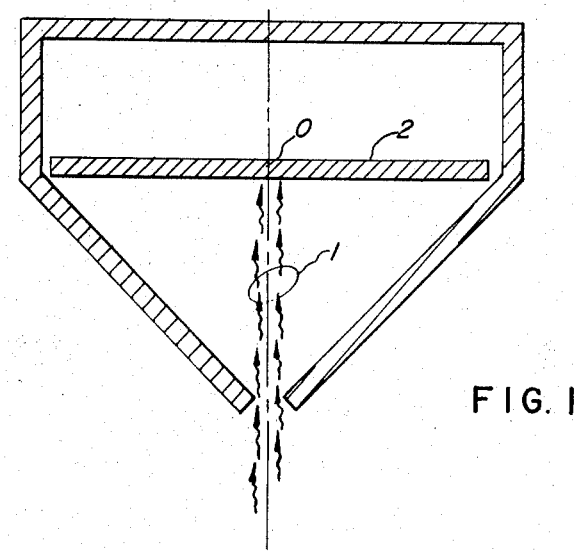
FIG. 1 illustrates the principle of the camera type system for the detection of ionizing particles.
Figure 2:
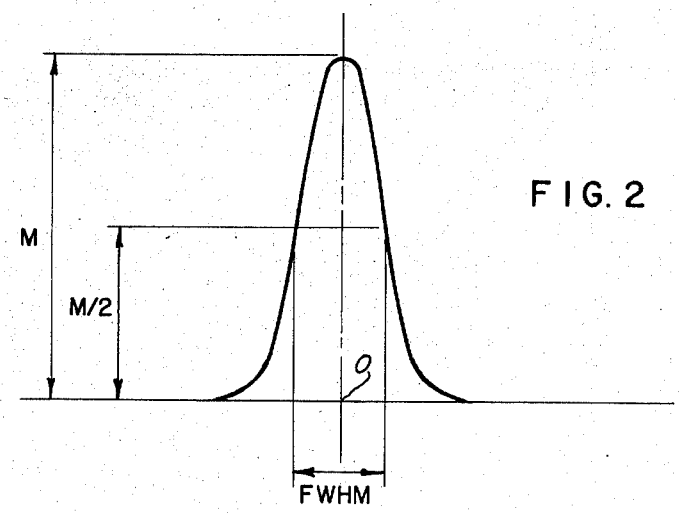
FIG. 2 illustrates a distribution function of the number of detected ionizing particles in a narrow beam perpendicular to a detector.

In a camera type system for the detection of ionizing radiation as shown in the schematic drawing of FIG. 1, when ionizing radiation 1 is incident on a detector 2 within a predetermined very small solid angle on a small circular point O whose surface area is known, a portion of the radiation quanta which are detected are registered in a zone deviating from this known area of the detector, the dimensions of which are determined by the outer boundary and constitution of the detecting system. A criterion of the distribution of the radiation quanta which are incident on the detector in the zone around point O and which are detected and registered is the resolution value defined as the "full width at half maximum," abbreviated FWHM, as shown in FIG. 2 where M designates the maximum and M/2 refers to half maximum of the number of quanta detected around point O. FWHM is limited by the extension of a spatially limited detector of a particular design and by the design and performance of the electronics of the detector in a camera type system for the detection and registering of ionizing radiation quanta.

Figure 3A:
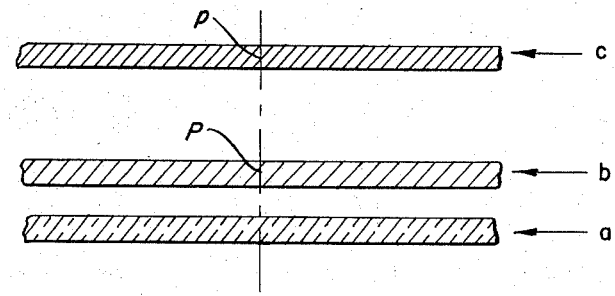

In an embodiment of a camera type system such as that shown schematically in FIG. 3a, a point P in the registering apparatus b corresponds to a point p in the documentation apparatus c. The registering signals are of an optical nature (typically flashes of light on a cathode ray tube (CRT) screen) and, therefore, an optical absorption filter, which is located between the registering system b and the documentation system c, prevents the documenting of the registered ionizing quanta.

Figure 3B:
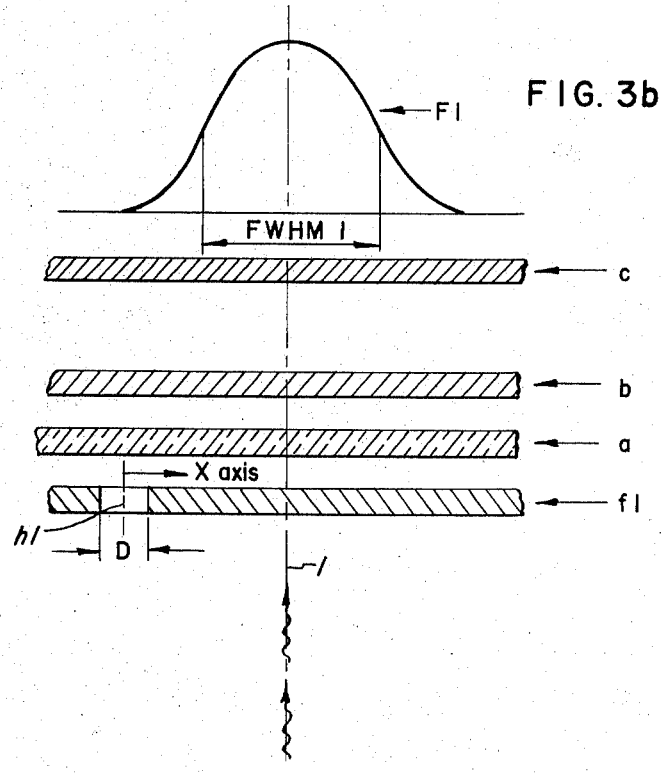

We now assume that, as shown in FIG. 3b, a narrow beam of ionizing quanta is incident on detector along a line 1. The beam has a cross section which is much smaller than the hole of diameter D in the radiation filter $f1$ which is located in front of detector a. Since radiation filter $f1$ is designed to move in the direction of the x-axis, the ionizing radiation quanta are recorded when hole $h1$ of diameter D traverses line 1 along which the ionizing quanta are incident on the detector. The registered quanta are documented with a distribution F1 having a certain resolution value FWHM 1 in a region around line 1 along which the ionizing quanta are incident on detector a.

As shown in FIG. 3c, the characteristic of one embodiment of the invention is that an optical absorption filter $f2$ is employed in combination with radiation filter $f1$ in such a manner that an optical registering signal, which is produced by the detected ionizing radiation quanta which are transmitted by the non-absorbing passageway $h1$ in radiation filter $f1$, is permitted to pass through a non-absorbing part $h2$ in the optical absorption filter $f2$ and thus also is permitted to be documented in the region e of the documentation apparatus c. Moreover, the optical absorption filter $f2$ is arranged to move synchronously with radiation filter $f1$ in a manner such that both filters act together in permitting the registering and documenting of all such ionizing quanta which are to be detected, registered and documented.

Since the optical absorption filter $f2$ and the radiation filter $f1$ are designed to move synchronously in the x-axis direction, as shown in FIG. 3c, the documenting of optical registering signals through hole $h2$ in the optical absorption filter is started when edge $k1$ on the non-absorbing part of the radiation filter $f1$ passes the beam 1 of ionizing radiation. Registering and documentation are completed when the opposite edge $k2$ passes beam 1. The documentation takes place in an area having the dimension of diameter D of the passageway in the radiation filter plus diameter $d$ of the aperture in the optical absorption filter. The documented ionizing quanta have a distribution $f2$ around line 1 along which they are incident on detector a and the resolution value FWHM 2 can be made smaller than the resolution value FWHM 1 (FIG. 3b), the value when no optical filter is used, with a suitable choice of the size of the holes in the two filters $f1$ and $f2$.

Figure 4:
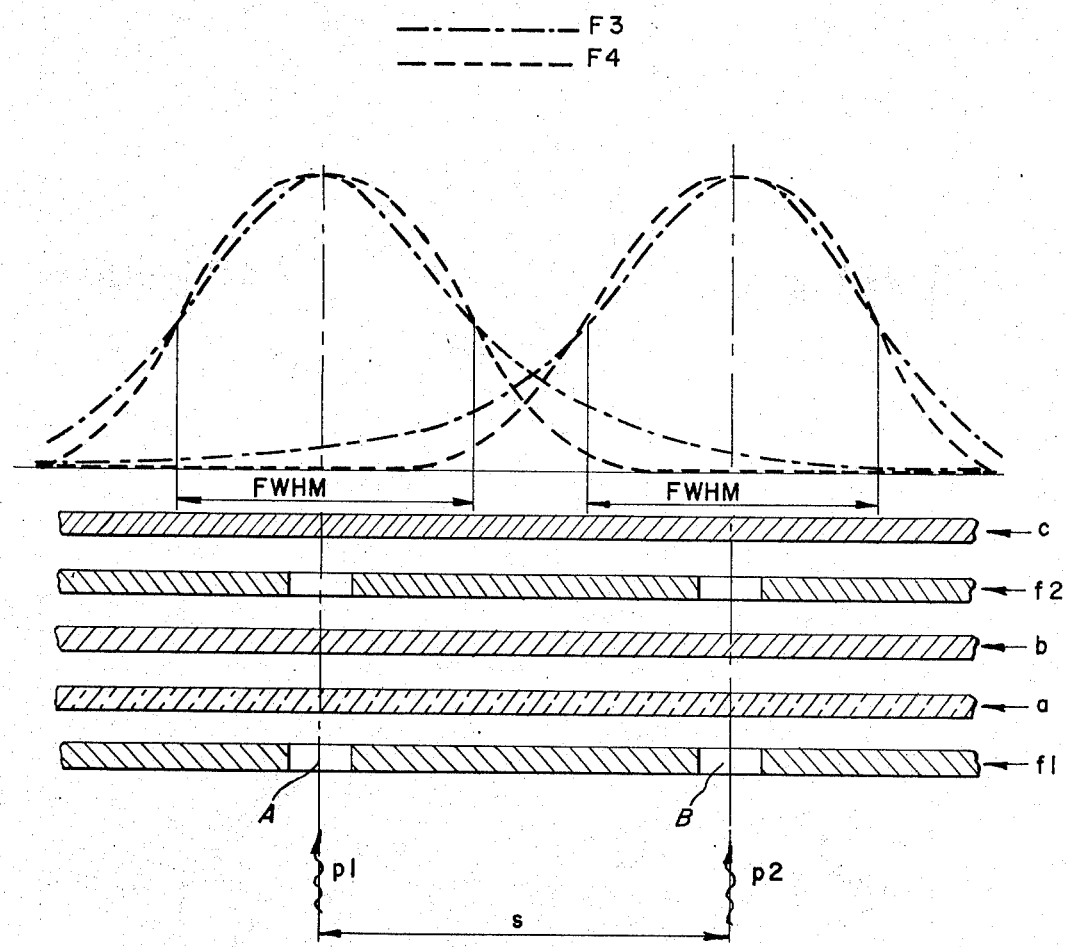
FIG. 4 is a schematic diagram which illustrates the influence of the distribution function on the probability of registering a false signal.

As shown in FIG. 4, the distance designated thereby $s$ between two adjacent holes in radiation filter $f1$ should be large enough that the probability is small that a radiation quantum $p2$ detected through passageway B will produce a registering signal which has the character, by virtue of its coordinate position on the registering medium, of a radiation quantum $p1$ which was detected through another hole A. The distance $s$ between two adjacent passageways in the radiation filter is determined for a certain probability of registering and documenting, through an incorrect hole in the optical filter, an erroneous signal on the basis of the known distribution function of the detector and the sizes of the holes in the two filters.

In FIG. 4, which shows the radiation filter $f1$, detector a, registering system b, optical absorption filter $f2$ and documentation apparatus c, both distribution functions F3 and F4 shown have the same FWHM but interference from an adjacent hole in measurements with a given detector which has distribution function F4 is considerably smaller than when the measurements are performed with a different given detector whose distribution function is F3 for the distance $s$ between holes which is shown in the figure. If the distribution function of the detector is F4, therefore, the distance $s$ between holes can be reduced so that the same degree of probability will apply to the recording of a false signal as in measurements with a detector with distribution function F3.

The absolute magnitude of the resolving distance in a system for detecting, registering and documenting ionizing radiation with the approach characterizing this invention is determined by the distribution and size of the non-absorbing zones, which do not necessarily need to be round, in the filters for the absorption of ionizing radiation and optical registering signals together with the choice of the distribution function which describes the resolution of detectors for ionizing radiation.

Figure 5:
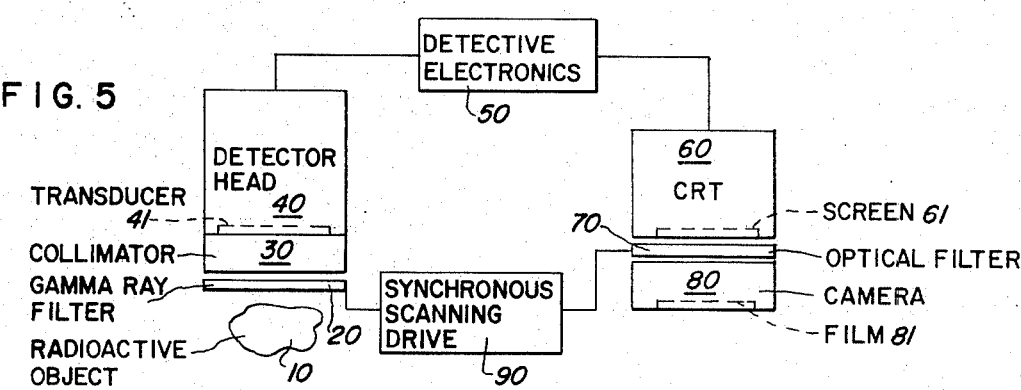
FIG. 5 is a block schematic diagram of one embodiment of this invention.

In FIG. 5 a block schematic diagram of one embodiment of a camera system in accordance with this invention is shown. Gamma rays (or other ionizing radiation) from object 10, which contains a distribution of radionuclides, pass through gamma ray filter 20 and collimator 30 and interact with a radiation sensitive transducer 41 in detector head 40. Gamma ray filter 20 may be constructed of a radiation opaque material such as lead of sufficient thickness to absorb essentially all of the gamma rays from object 10 except those which pass through passageways (such as 211, 221, etc., FIG. 7a; A and B, FIG. 4; h1, FIG. 3c) in the filter. Collimator 30 is a multichannel collimator which may also be constructed of radiation opaque material such as lead. As set forth above, gamma ray filter 20 and collimator 30 may be combined into a single unit by providing a sufficient length for the gamma admitting passageways for adequate collimation of the gamma rays. Also gamma ray filter 20 can be positioned between collimator 30 and transducer 41. If a pinhole collimator were mounted on detector head 40, gamma ray filter 20 would have to be mounted between the collimator and transducer 41.

Detector head 40 is preferably an Anger type detector (U.S. Pat. No. 3,011,057). Transducer 41 s preferably a thin disc shaped crystal of thallium activated sodium iodide which scintillates when a gamma ray from object 10 interacts therewith. A bank of photomultiplier tubes in detector head 40 receive light from a scintillation in the sodium iodide crystal and, together with detector electronics 50, produce a pair of electrical signals representing the coordinates of the scintillation in the crystal. Pulse height selection is also performed in detector electronics 50, and those scintillations which satisfy the pulse height selection criteria produce an unblanking signal. The coordinate electrical signals and the unblanking signal are fed to a cathode ray tube 60 which produces a flash of light on screen 61 in a position corresponding to the coordinates of the scintillation in the crystal.

Optical filter 70 is positioned between screen 61 and a film 81 in camera 80 which serves as a documentation medium. A synchronous scanning drive 90 produces a scanning motion between gamma ray filter 20 and object 10 and reproduces that scanning motion in optical filter 70.

Figure 7A:
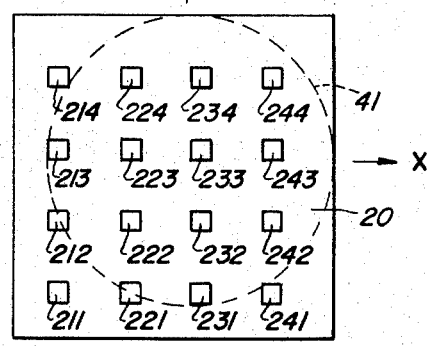
FIGS. 7a and 7b are illustrations useful in explaining the operation of this invention.
Figure 7B:
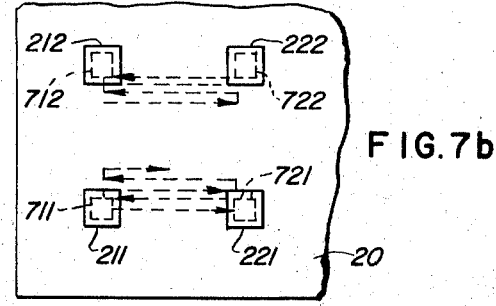

FIGS. 7a and 7b are exemplary of an array of apertures (e.g. 211, 221, 231, etc.) in gamma ray filter 20 which together with collimator 30 comprise a radiation filter means which defines a plurality of mutually spaced passageways to the crystal (transducer 41) for gamma rays (radiation quanta) emitted from object 10. In an actual embodiment an aperture pattern having more than 16 apertures in a 4 by 4 array might be employed and this invention is, of course, not limited to a gamma ray filter having square apertures in a square array. FIG. 7b illustrates one form of scanning motion for gamma ray filter 20 and correspondingly for optical filter 70 which has similar geometric properties. Apertures 711, 721, 712, and 722 in optical filter 70 are shown in dotted lines within corresponding apertures 211, 221, 212, and 222 in gamma ray filter 20 to illustrate the similar geometry of optical filter 70. In an actual embodiment, scale factors would be involved if the crystal (transducer 41) were larger than the CRT screen 61.

It should be apparent that, instead of scanning gamma ray filter 20 and optical filter 70 independent of detector head 40 and CRT 60, the two filters could be mechanically fixed to detector head 40 and CRT 60 and then either the detector head and CRT together with the filters could be scanned with respect to object 10 and film 81 or object 10 and film 81 could be scanned with respect to detector head 40 and CRT 60. Various other combinations of scanning could also be employed.

Figure 6:
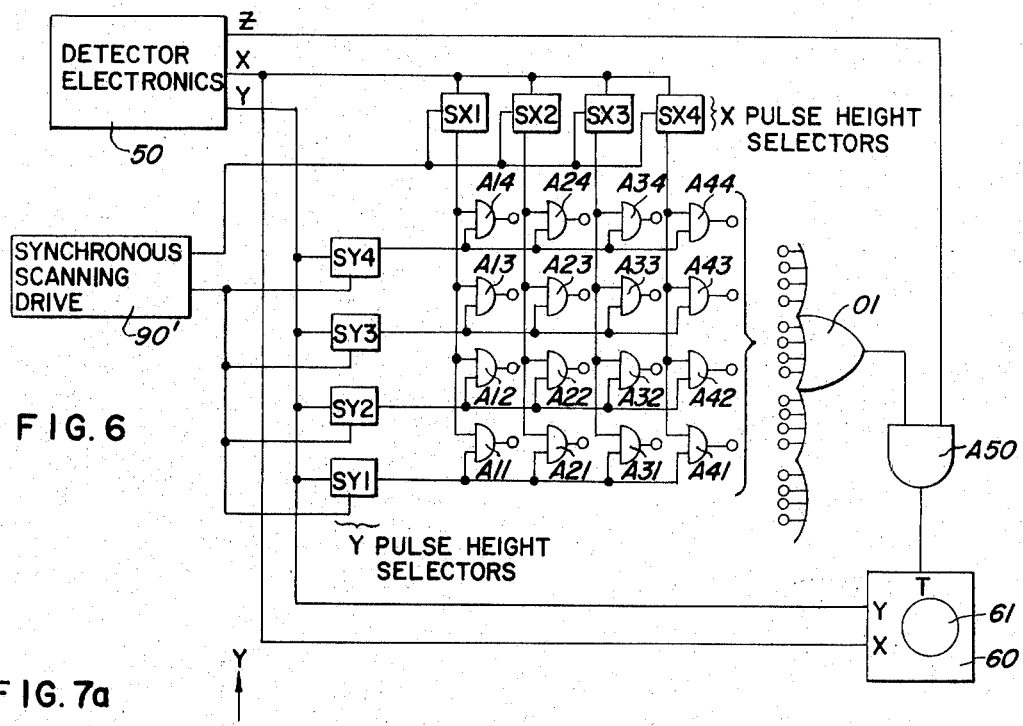
FIG. 6 is a partial block schematic diagram of an alternate embodiment of this invention.

In FIG. 6 an electrical analog to the optical filter shown in FIG. 5 is illustrated. Each of the X and Y coordinate output electrical signals from detector electronis 50 is fed to a series of pulse height selectors. The X pulse height selectors, SX1 through SX4, and the Y pulse height selectors, SY1 through SY4, have their outputs coupled to input terminals of a matrix of AND gates A11, A21, A31, etc. The X and Y pulse height selectors are adjusted so that each is positioned with respect to the range of coordinate output pulse magnitudes to respond with an output signal when the X and Y signal falls within a particular band. The width of the band is controlled by the width of the pulse height selector window. A set of X, Y coordinate signals which simultaneously triggers SY1 and SX1 will produce an output signal from AND gate A11. Every one of the outputs of the AND gates in the matrix are coupled to an OR gate 01 so if any of the AND gates has an output, OR gate 01 also produces an output. If an output from OR gate 01 coincides with an unblanking pulse Z from detector electronics 50, AND gate A50 is fired to trigger an unblanking of CRT 60. Thus if a set of X, Y signals simultaneously triggers SX1 and SY1 and an unblanking pulse Z is provided, CRT 60 will produce a flash of light at the X, Y coordinate. It should be apparent that the circuitry in FIG, 6 can be adjusted to produce the same result in a photograph of CRT screen 61 as optical filter 70 of FIG. 5. Synchronous scanning drive 90' provides signals to the X and Y pulse height selectors to scan the positions of the windows of the pulse height selectors in a manner similar to the scanning of apertures in optical filter 70.

In the embodiment of FIG. 5, the output from the radiation detector is visible spots of light spatially positioned on CRT screen 61; and optical filter 70 is a signal filtering means receiving the output of the radiation detector and producing on a documentation medium (film 81), in limited areas at positions corresponding to coordinates of intersection of central axes of passageways defined by gamma ray filter 20 and collimator 30 with transducer 41, a visual documentation of a portion of quanta of radiation interacting with transducer 41.

In the embodiment of FIG. 6, the output from the radiation detector is considered to be the X, Y coordinate electrical signals; and the electrical circuitry comprising the X and Y pulse height selectors, the matrix of AND gates, OR gate 01, AND gate A50, and CRT 60 is an analogous "signal filtering means".

The embodiments of this invention shown in the drawings and described in detail above are only exemplary and numerous modifications could be made without departing from the scope of this invention as claimed in the following claims.

I claim:

1. Apparatus for imaging an object containing a radioactivity distribution comprising:

a radiation detector, including a radiation sensitive transducer, of the type producing an output representing coordinates of interaction of quanta of radiation with said transducer, said detector having a predetermined resolution value expressed in terms of full width at half maximum;

radiation filter means interposed between said transducer and said object for defining a plurality of mutually spaced radiation passageways to said transducer for radiation quanta emitted from said object;

a documentation medium;

signal filtering means receiving said output of said radiation detector operative to produce on said documentation medium, in limited areas at positions corresponding to coordinates of intersection of said central axes of said passageways with said transducer, a visual documentation of at least a portion of said quanta of radiation interacting with said transducer; and scanning means for producing relative scanning between said object and said radiation filter means and a corresponding synchronous relative scanning between said documentation medium and said signal filtering means such that all of said object is exposed to said transducer through said radiation passageways;

the size and separation distance of said radiation passageways and the size of said limited areas of documentation being preselected in terms of said full width at half maximum resolution value of said detector to produce a desired value of resolution of the overall apparatus.

2. Apparatus as claimed in claim 1, wherein said radiation filter means comprises:

a radiation collimator mounted on said radiation detector; and a radiation filter movably mounted on said radiation detector; said filter comprising a flat plate of substantially radiation opaque material having a plurality of apertures therein and having a thickness sufficient to absorb substantially all ionizing quanta emitted from said object toward said transducer except such quanta as pass through said apertures.

3. Apparatus as claimed in claim 1, wherein said radiation filter means comprises a radiation filter and collimator combination comprising a volume of substantially radiation opaque material having a plurality of spaced passageways therethrough, said passageways having a length sufficient to collimate radiation quanta emitted from said object and said volume having a thickness sufficient to absorb substantially all ionizing quanta emitted from said object toward said transducer except such quanta as pass through said passageways.

4. Apparatus as claimed in claim 1, wherein said radiation detector further includes an output screen and said output from said radiation detector comprises flashes of light each spatially located on said screen at coordinates corresponding to coordinates of interaction of a quantum of radiation with said transducer; and said signal filtering means comprises an optical filter interposed between said output screen and said documentation medium, said optical filter defining a plurality of mutually spaced optical passageways to said documentation medium for light emitted from said screen, said optical passageways corresponding in geometric arrangement with said radiation passageways.

5. Apparatus for imaging an object containing a radioactivity distribution comprising:

a radiation detector, including a radiation sensitive transducer and an output phosphor screen, of the type producing on said screen a registration of quanta of radiation interacting with said transducer in the form of flashes of light each spatially located on said screen at coordinates corresponding to coordinates of interaction of an associated quantum of radiation, said detector having a predetermined resolution value expressed in terms of full width at half maximum of the response of the detector to a narrow beam of radiation quanta incident on said transducer in a normal direction;

radiation filter means interposed between said transducer and said object for defining a plurality of mutually spaced radiation passageways to said transducer for radiation quanta emitted from said object;

a light sensitive photographic film mounted in a position to document flashes of light appearing on said output phosphor screen;

optical filtering means interposed between said output phosphor screen and said film for defining a plurality of mutually spaced optical passageways to said film for light emitted from said screen, said optical passageways corresponding in geometric arrangement with said radiation passageways; and scanning means for producing synchronous relative scanning movement between said object and said radiation filter means and between said film and said optical filtering means such that all of said object is exposed to said transducer through said radiation passageways and all of said film is exposed to said output phosphor screen through said optical passageways;

the size and separation distance of said radiation passageways and the size of said optical passageways being preselected in terms of said full width at half maximum resolution value of said detector to produce a desired value of resolution of the overall apparatus.

6. Apparatus as claimed in claim 5, wherein said radiation filter means comprises:

a radiation collimator mounted on said radiation detector; and a radiation filter mounted on said radiation detector; said filter comprising a flat plate of substantially radiation opaque material having a plurality of apertures therein and having a thickness sufficient to absorb substantially all ionizing quanta emitted from said object toward said transducer except such quanta as pass through said apertures.

7. Apparatus as claimed in claim 5, wherein said radiation filter means comprises a radiation filter and collimator combination comprising a volume of substantially radiation opaque material having a plurality of spaced passageways therethrough, said passageways having a length sufficient to collimate radiation quanta emitted from said object and said volume having a thickness sufficient to absorb substantially all ionizing quanta emitted from said object toward said transducer except such quanta as pass through said passageways.

8. Apparatus for imaging an object containing a radioactivity distribution comprising:

an Anger-type radiation detector having a scintillation crystal in the form of a thin disc, electronic circuitry for developing a pair of electrical signals corresponding to coordinates of interaction of a quantum of radiation with said crystal, and a cathode ray tube for registering quanta of radiation interacting with said transducer as flashes of light located in accordance with said pair of electrical signals, a radiation collimator mounted on said detector between said scintillation crystal and said object;

a radiation filter movably mounted between said scintillation crystal and said object, comprising a flat plate of substantially radiation opaque material having a plurality of apertures therein and having a thickness sufficient to absorb substantially all ionizing quanta emitted from said object toward said transducer except such quanta as pass through said apertures;

a photographic camera including a light sensitive photographic film mounted on said cathode ray tube for documenting flashes of light produced therein;

an optical filter movably mounted between said cathode ray tube and said camera, comprising a flat plate of light opaque material having a plurality of apertures therein with the same geometric arrangement as said apertures in said radiation filter; and scanning means for producing synchronous relative scanning movement between said radiation filter and said object and between said film and said optical filter such that all of said object is exposed to said scintillation crystal and all of said film is exposed to said cathode ray tube;

the size and separation distance of said apertures in said radiation filter and the size of said optical passageways being preselected to produce a desired value of resolution of the overall apparatus.

9. Apparatus for high resolution imaging of an object containing a radioactivity distribution comprising:

radiation filter means mounted adjacent said object for defining a plurality of mutually spaced passageways for radiation quanta emitted from said object;

radiation detecting means for detecting, in at least a substantially separate manner, radiation quanta traversing each of said passageways;

radiation registering means at the output of said radiation detecting means for visually registering at least a portion of said detected radiation quanta at locations substantially corresponding to central axes of said mutually spaced passageways;

documenting means for documenting said visual registrations; and scanning means for producing synchronous relative scanning between said object and said radiation filter means and between said radiation registering means and said documenting means so that all of said object is exposed to said radiation detecting means and information on all areas of said radioactivity distribution is documented on said documenting means.

10. Apparatus for high resolution imaging of an object containing a radioactivity distribution comprising:

radiation filter means mounted adjacent said object for defining a plurality of mutually spaced passageways for radiation quanta emitted from said object;

means for detecting, in at least a substantially separate manner, radiation quanta traversing each of said passageways and for documenting, at an array of positions corresponding to locations of central axes of said passageways, at least a portion of said radiation quanta detected; and means for producing relative scanning between said radiation filter means and said object and synchronous scanning of said array of positions such that information on all areas of said radioactivity distribution is documented.

* * * * *